US012683809B2

(12) United States Patent
Kim et al.

(10) Patent No.: US 12,683,809 B2
(45) Date of Patent: Jul. 14, 2026

(54) METHOD AND APPARATUS FOR VERIFYING FIRMWARE

(71) Applicant: Samsung Electronics Co., Ltd., Suwon-si (KR)

(72) Inventors: Sewon Kim, Suwon-si (KR); Kyung-Woo Noh, Suwon-si (KR); Yeongae Yu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 195 days.

(21) Appl. No.: 18/483,951

(22) Filed: Oct. 10, 2023

(65) Prior Publication Data

US 2024/0267235 A1      Aug. 8, 2024

(30) Foreign Application Priority Data

Feb. 3, 2023      (KR) ........................ 10-2023-0015031

(51) Int. Cl.
*H04L 9/32*          (2006.01)
*H04L 9/08*          (2006.01)

(52) U.S. Cl.
CPC .......... *H04L 9/3268* (2013.01); *H04L 9/0825* (2013.01); *H04L 9/3236* (2013.01); *H04L 9/3247* (2013.01)

(58) Field of Classification Search
CPC .................................................... H04L 9/3268
See application file for complete search history.

(56) References Cited

U.S. PATENT DOCUMENTS

| | | | |
|---|---|---|---|
| 8,914,627 B2 | 12/2014 | Park et al. | |
| 9,288,064 B2 | 3/2016 | Xiao | |
| 9,454,661 B2 | 9/2016 | Chen et al. | |
| 10,206,114 B2 | 2/2019 | Choi et al. | |
| 10,872,155 B2 * | 12/2020 | Oh .......................... | G06F 21/64 |
| 10,887,770 B2 | 1/2021 | Choi et al. | |
| 2002/0019946 A1 * | 2/2002 | Iwamura ............. | G06F 21/1077 |
| | | | 709/224 |
| 2004/0250070 A1 * | 12/2004 | Wong ...................... | G06F 21/64 |
| | | | 713/170 |
| 2012/0210115 A1 | 8/2012 | Park et al. | |
| 2015/0261521 A1 * | 9/2015 | Choi ..................... | H04L 9/3236 |
| | | | 713/176 |
| 2017/0004290 A1 * | 1/2017 | Pedersen ............... | H04R 25/70 |
| 2019/0191310 A1 | 6/2019 | Choi et al. | |
| 2019/0278915 A1 | 9/2019 | Kim et al. | |
| 2022/0121749 A1 | 4/2022 | Liu et al. | |

FOREIGN PATENT DOCUMENTS

| | | |
|---|---|---|
| KR | 2012-0092222 A | 8/2012 |
| KR | 10-1782378 B1 | 9/2017 |
| KR | 10-2139546 B1 | 7/2020 |

\* cited by examiner

*Primary Examiner* — Bradley W Holder
(74) *Attorney, Agent, or Firm* — Harness, Dickey & Pierce, P.L.C.

(57)          ABSTRACT

A method for verifying firmware includes verifying a firmware certificate of the firmware using a first public key, verifying validity of a second public key included in the firmware certificate in response to successful verification of the firmware certificate, verifying the firmware using the second public key in response to successful verification of validity of the second public key, and in response to successful verification of validity of the firmware, installing the firmware in memory of an electronic device to operate hardware of the electronic device according to the firmware.

16 Claims, 7 Drawing Sheets

METHOD AND APPARATUS FOR VERIFYING FIRMWARE

CROSS-REFERENCE TO RELATED APPLICATION

This application claims priority to and the benefit of Korean Patent Application No. 10-2023-0015031 filed in the Korean Intellectual Property Office on Feb. 3, 2023, the entire contents of which are incorporated herein by reference.

FIELD

The inventive concepts relate to a method and/or apparatus for verifying validity of firmware.

BACKGROUND

Firmware is software included in a specific hardware apparatus and is a kind of an operating system responsible for controlling and driving hardware. The firmware may be stored in a read only memory (ROM) or a programmable ROM (PROM) in the hardware and may be updated.

When updating the firmware, it may be desirable to periodically change a security key of the firmware to meet recommendations of NIST, etc., but the number of security keys that can be discarded may be limited due to a limitation of storage space of electronic devices where the firmware will be installed.

The above information disclosed in this Background section is only for enhancement of understanding of the background of the inventive concepts, and therefore it may contain information that does not form the prior art.

SUMMARY

Some example embodiments provide a method for verifying firmware for updating electronic devices.

Some example embodiments provide a method for distributing firmware images for updating electronic devices.

Some example embodiments provide an apparatus for verifying firmware for updating electronic devices.

According to an example embodiment, a method for verifying firmware includes verifying a firmware certificate of the firmware using a first public key, verifying validity of a second public key included in the firmware certificate in response to successful verification of the firmware certificate, verifying the firmware using the second public key in response to successful verification of validity of the second public key, and in response to successful verification of validity of the firmware, installing the firmware in memory of an electronic device to operate hardware of the electronic device according to the firmware.

In an example embodiment, the method may further include obtaining the first public key from the memory of the electronic device.

In an example embodiment, the obtaining of the first public key from the memory of the electronic device may include checking the index of the first signing key pair currently being used in the key index region of the electronic device; and obtaining the first public key with the identified index from a read only memory (ROM) of the electronic device.

In an example embodiment, the verifying of the firmware certificate of the firmware by using the first public key may include: obtaining a first hash value of the firmware certificate by decrypting the signature of the firmware certificate by using the first public key; calculating a second hash value of the firmware certificate by using a hash algorithm; and verifying the firmware certificate by comparing the first hash value and the second hash value.

In an example embodiment, the verifying of the firmware certificate by comparing the first hash value and the second hash value may include discarding the firmware image of the firmware when the first hash value and the second hash value are different; or determining that the firmware certificate is valid when the first hash value and the second hash value are the same.

In an example embodiment, the verifying of the second public key included in the firmware certificate when the firmware certificate is verified may include determining that the second public key is valid when the hash value of the second public key is not the same as a blacklist fingerprint in the fingerprint region in the electronic device.

In an example embodiment, the determining that the second public key is valid when the hash value of the second public key is not the same as the blacklist fingerprint in the fingerprint region in the electronic device may include determining that the second public key is valid when the hash value of the second public key is the same as a whitelist fingerprint in the fingerprint region.

In an example embodiment, the determining that the second public key is valid when the hash value of the second public key is not the same as the blacklist fingerprint in the fingerprint region in the electronic device may include recording the hash value of the second public key in the fingerprint region and determining that the second public key is valid when the same hash value as the hash value of the second public key does not exist in the fingerprint region.

In an example embodiment, the verifying of the firmware by using the second public key obtained from the verified firmware certificate may include: calculating a third hash value of the firmware by using a hash algorithm; obtaining a fourth hash value by decoding the firmware signature by using the second public key; and verifying the validity of the firmware by comparing the third hash value and the fourth hash value.

In an example embodiment, the verifying of the validity of the firmware by comparing the third hash value and the fourth hash value may include discarding the firmware image of the firmware when the third hash value and the fourth hash value are different; or determining that the firmware is valid when the third hash value and the fourth hash value are the same.

According to another example embodiment, a method for distributing a firmware image for updating an electronic device includes generating a signature of a firmware certificate using a first private key, generating a firmware signature for a firmware using a second private key, the second private key different from the first private key, distributing the firmware, the firmware certificate including the signature of the firmware certificate, and the firmware image including the firmware signature; and installing the firmware in memory of an electronic device to operate hardware of the electronic device according to the firmware.

In another example embodiment, the first public key corresponding to the first private key may be stored in a read only memory (ROM) in the electronic device.

In another example embodiment, the generating of the signature of the firmware certificate by using the first private key may include encrypting the hash value of the second public key corresponding to the second private key by using the first private key, distributing the firmware, the firmware certificate including the signature of the firmware certificate, the firmware image including the firmware signature.

and the firmware certificate may include a certification date, a certification authority, and a second public key.

In another example embodiment, the generating of the firmware signature for the firmware by using the second private key different from the first private key may include: calculating a hash value of the firmware by using a hash algorithm; and encrypting the hash value by using the second private key.

According to another example embodiment, an apparatus for verifying firmware for updating an electronic device includes a processor, and a memory, wherein the processor is configured to execute a program included in the memory to perform verifying a firmware certificate of the firmware using a root public key, verifying a firmware public key obtained from the firmware certificate, verifying the firmware using the firmware public key in response to a successful verification of validity of the firmware public key, and installing the firmware in the memory to operate hardware of the electronic device according to the firmware.

In another example embodiment, when performing the verifying of the firmware certificate of the firmware by using the root public key, the processor may perform: obtaining a hash value of the firmware certificate from the signature of the firmware certificate decrypted by using the root public key; calculating a hash value of the firmware certificate by using a hash algorithm; and determining that the firmware certificate is valid when the calculated hash value and the obtained hash value are the same.

In another example embodiment, when performing the verifying of the firmware public key obtained from the firmware certificate, the processor may perform determining that the firmware certificate is valid when the hash value of the firmware public key is the same as the whitelist fingerprint in the fingerprint region in the electronic device.

In another example embodiment, when performing the verifying of the firmware public key obtained from the firmware certificate, the processor may perform registering the hash value to the fingerprint region and determining that the firmware public key is valid when the hash value of the firmware public key is not the same as the blacklist fingerprint or the whitelist fingerprint in the fingerprint region in the electronic device.

In another example embodiment, the processor may execute the program to further execute checking the index of the first signing key pair currently being used in the key index region of the electronic device, and obtaining the first public key with the identified index from a read only memory (ROM) of the electronic device.

In another example embodiment, when performing the verifying of the firmware by using the firmware public key verified to be valid, the processor may execute: calculating the hash value of the firmware by using a hash algorithm; obtaining a hash value of the firmware by decrypting the firmware signature by using the firmware public key; and determining that the firmware is valid when the calculated hash value and the obtained hash value are the same.

DETAILED DESCRIPTION

Figure 1:
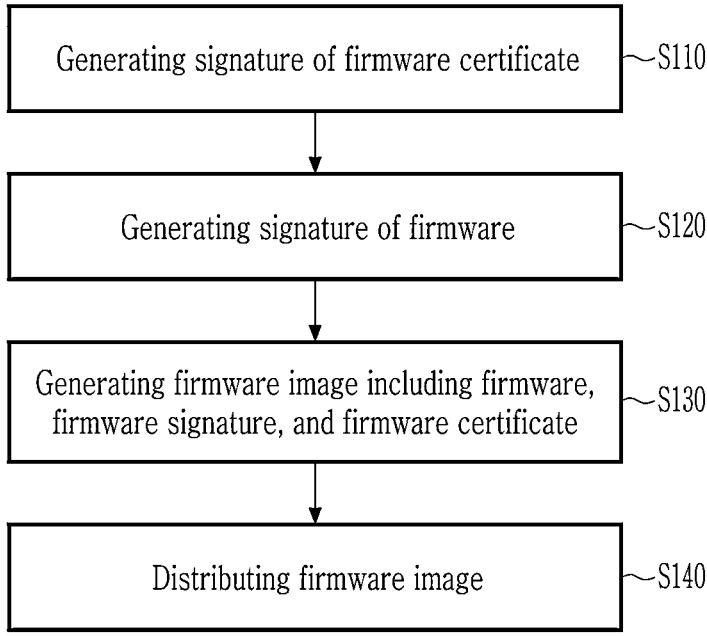
FIG. 1 is a flowchart showing a method for generating a signed firmware image according to an example embodiment.

In the following detailed description, only some example embodiments of the inventive concepts have been shown and described in detail with reference to the accompanying drawings, simply by way of illustration. However, the inventive concepts may be implemented in various different forms and are not limited to the example embodiments described herein. Further, in order to clearly describe the illustrations in the drawings, parts not related to the description are omitted, and similar reference numerals are attached to similar parts throughout the specification.

In addition, unless explicitly described to the contrary, the word "comprise", and variations such as "comprises" or "comprising", will be understood to imply the inclusion of stated elements but not the exclusion of any other elements.

In the description, expressions described in the singular in this specification may be interpreted as the singular or plural unless an explicit expression such as "one" or "single" is used.

As used herein, "and/or" includes each and every combination of one or more of the recited elements.

In the present specification, it will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the inventive concepts.

In a flowchart described with reference to drawings in this specification, the order of operations may be changed, several operations may be merged, some operations may be divided, and specific operations may not be performed.

Figure 2:
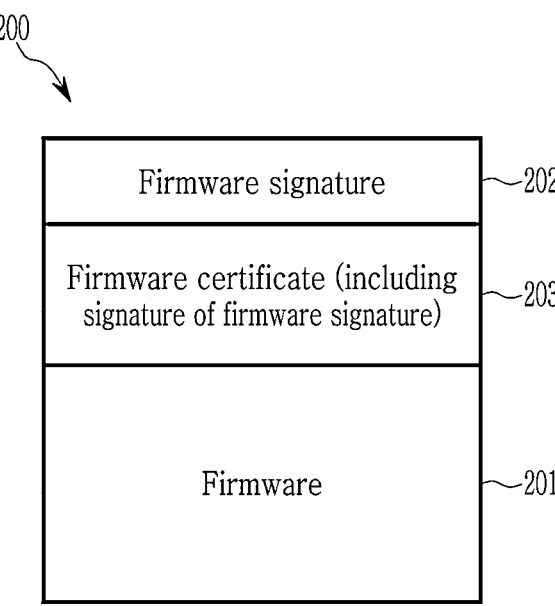
FIG. 2 is a view showing a signed firmware image according to an example embodiment.

FIG. 1 is a flowchart showing a method for generating a signed firmware image according to an example embodiment, and FIG. 2 is a view showing a signed firmware image according to an example embodiment.

A firmware manufacturing apparatus according to an example embodiment may generate a signed firmware image by using two key pairs and distribute a signed firmware image. In an example embodiment, the two key pairs may include a root signing key pair and a firmware signing key pair. Also, each key pair includes a private key and a public key.

In an example embodiment, a root certificate issued by using the root private key of the root signing key pair may be stored in an electronic device (e.g., a storage unit such as a hard disk drive (HDD), a solid state drive (SSD), etc.) operated by a central processing unit (CPU) and a memory. The root public key may be included in the root certificate.

In an example embodiment, the root certificate may be stored in the ROM in the electronic device, and the electronic device including the root certificate may be sold to the user. For example, the root certificate may be inserted as a part of a ROM code (e.g., an executable code in the ROM) in the ROM of the SSD.

In an example embodiment, a desired (or alternatively, predetermined) number of root certificates may be recorded in a ROM in an electronic device. For example, ten root certificates may be recorded in the ROM, and the root public key included in each root certificate may be different. The firmware verifying apparatus of the electronic device may check the index of the root signing key pair currently in use, and the root public key of the verified index may be used for verifying the firmware certificate.

In an example embodiment, the firmware manufacturing apparatus may create the firmware for the electronic device sold to the user, and generate and distribute the signed firmware image for authenticating the validity of the firmware. The firmware manufacturing apparatus may create the signed firmware image by using the root signing key pair and the firmware signing key pair.

In an example embodiment, the firmware manufacturing apparatus may generate a signature of the firmware certificate for the firmware by using the root private key (S110). The firmware manufacturing apparatus may generate the signature of the firmware certificate by calculating a hash value of the firmware certificate by applying a hash algorithm for the firmware certificate and encrypting the hash value of the firmware certificate by using the root private key. In an example embodiment, the firmware certificate may include a certification date, a certification authority, and a firmware public key.

Alternatively, or in addition, the firmware manufacturing apparatus may generate the signature of the firmware certificate by calculating the hash value by applying the hash algorithm to the firmware public key and encrypting the hash value of the firmware public key by using the root private key. According to an example embodiment, the firmware certificate may include the signature of the firmware certificate and the firmware public key.

Also, the firmware manufacturing apparatus can generate the firmware signature for the firmware by using the firmware private key (S120). In an example embodiment, the firmware manufacturing apparatus may generate the firmware signature by calculating the hash value of the firmware by applying the hash algorithm for the firmware and encrypting the hash value of the firmware with the firmware private key.

Afterwards, the firmware manufacturing apparatus may generate a firmware image including the firmware, the firmware signature, and the firmware certificate (S130), and may distribute the signed firmware image for the updating of the sold electronic devices (S140). Then, the signed firmware image may be downloaded to the electronic device, and when the validity of the firmware image is verified, the firmware may be installed on the electronic device.

Referring to FIG. 2, the firmware image 200 created by the firmware manufacturing apparatus may include the firmware 201, the firmware signature 202, and the firmware certificate 203. Here, the firmware certificate may include the signature of the firmware certificate.

In an example embodiment, the validity of the signature of the firmware certificate may be verified through the root public key, and the root public key may be included in the root certificate in the ROM of the electronic device sold to the user.

In addition, the validity of the firmware signature may be verified through the firmware public key, and the firmware public key may be included in the firmware certificate transmitted to the electronic device side through the firmware image.

In some example embodiments, the validity of the firmware according to an example embodiment may be sequentially verified by the certificate chain of the root certificate and the firmware certificate, and the security of the firmware for updating the electronic device may be enhanced.

Figure 3:
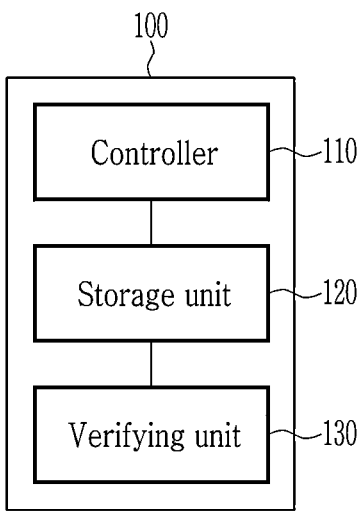
FIG. 3 is a block diagram showing a firmware verifying apparatus according to an example embodiment of the inventive concepts.

FIG. 3 is a block diagram showing a firmware verifying apparatus according to an example embodiment of the inventive concepts.

Referring to FIG. 3, the firmware verifying apparatus 100 may include a controller 110, a storage unit 120, and a verifying unit 130. In an example embodiment, the firmware verifying apparatus 100 may be included in the controller of the electronic device such as an SSD. The firmware verifying apparatus 100 verifies the validity of the firmware received for updating the electronic device, and when the firmware is determined to be valid, it may store the firmware in the flash memory (e.g., a NAND memory, etc.) to install the firmware. In an example embodiment, when the electronic device is the SSD, the firmware verifying apparatus 100 may be included in the controller of the SSD, and may store firmware that is verified to be valid in the flash memory of the SSD.

When power is applied to the electronic device, the controller 110 may check whether there is firmware to be updated online, and download the firmware image when there is firmware to be updated. The firmware image downloaded through the Internet may be stored in the storage unit 120. Then, when the validity of the firmware is verified by the verifying unit 130, the controller 110 may delete the firmware image or update the firmware according to the verifying result.

The verifying unit 130 may start the verifying of the firmware stored in the storage unit 120 according to instructions from the controller 110. The verifying unit 130 may verify the validity of the firmware through the firmware certificate and the firmware signature included in the firmware image.

Figure 4:
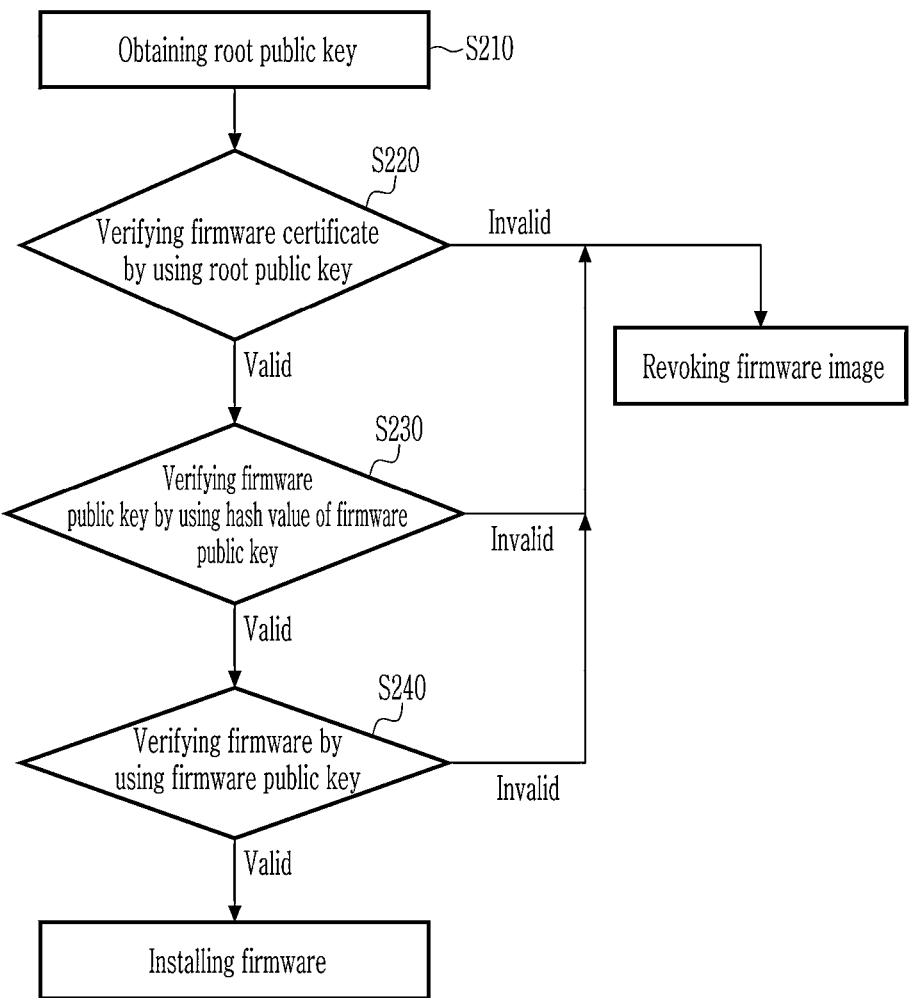
FIG. 4 is a flowchart showing a firmware verifying method according to an example embodiment.

FIG. 4 is a flowchart showing a firmware verifying method according to an example embodiment.

In an example embodiment, the controller 110 of the firmware verifying apparatus 100 controls the verifying unit 130 to verify the validity of the firmware image stored in the storage unit 120, and when the validity verification is successful, may execute the firmware code to install the firmware in the electronic device. The verifying unit 130 may verify the validity of the firmware code stored in the storage unit 120 by executing the ROM code.

Referring to FIG. 4, the verifying unit 130 may obtain the root public key from the memory in the electronic device (S210), and verify the firmware certificate by using the root public key (S220).

In an example embodiment, the verifying unit 130 may obtain the root public key from the root certificate inserted into the ROM code. The verifying unit 130 may check the index of the root signing key pair currently in use within the memory (e.g., one-time programmable (OTP) memory) of the electronic device, and obtain the root public key corresponding to the index of the currently used root signing key pair in the root certificate of the ROM code.

The use of the root signing key pair may be determined by the manufacturer side of the electronic device. For example, when the root signing key pair in use among n number of the root signing key pairs becomes unusable due to an attack by a third party (e.g., a key stealing attack, etc.), another root signing key pair other than the leaked root signing key pair may be used for the root signing. At this time, the information about the invalidity of the previously used root signing key pair and the newly used root signing key pair may be notified to each electronic device through the firmware update, etc. Alternatively, or in addition, the root signing key pair may be changed at the request of the user. When there is a user request, the firmware manufacturing apparatus may generate and distribute the firmware image based on the root signing key pair changed by the request of the user.

Table 1 below shows key index regions that indicate an available state of the root signing key pair included in the memory of the electronic device.

TABLE 1

| Key index | State |
|-----------|-------|
| 0 | 0xFFFF |
| 1 | 0 |
| . . . | . . . |

In an example embodiment, the key index region may be positioned within the OTP memory of the electronic device. Therefore, the state of each key index in the key index region may be changed only once. For example, when the electronic device is shipped from a factory, the states of all key indexes are marked as in use, and then the state of the invalid key index may be recorded once. The order of using the root signing key pair may be determined in advance, or dynamically changed through a firmware update. For example, the root signing keys may be desired (or alternatively, predetermined) to be used sequentially, starting at index 0.

Referring to Table 1, the status of the root signing key pair at the index 0 is indicated as 0xFFFF, and 0xFFFF may be a value (e.g., an invalid value) indicating that the root signing key pair at index 0 is not available. The status of the root signing key pair of the index 1 is indicated as 0, and 0 may be a value (e.g., a valid value) indicating that the root signing key pair of the index 1 is currently in use. For example, there may be a situation in which the key pair with index 0 becomes unusable due to a third party attack, and then the key pair with index 1 is used for certificate verification. The order of use of the root signing key pair can be determined in advance and included in the electronic device, and may be changed through the firmware update.

Table 2 below shows the root public key of the root certificate included in the memory of the electronic device. In an example embodiment, a plurality of root certificates each including one root public key may be inserted into the ROM of the electronic device.

TABLE 2

| Root Public Key 0 |
|-------------------|
| Root Public Key 1 |
| . . . |

In an example embodiment, the verifying unit 130 of the firmware verifying apparatus 100 may check the index of the root signing key pair currently being used in the key index region in the OTP memory of the electronic device, and may obtain the root public key having the confirmed index from the ROM of the electronic device. For example, the verifying unit 130 may confirm that the root signing key pair of index 1 is in use from the key index region in the OTP, and obtain the root public key of index 1 from the root certificate in the ROM.

Thereafter, the verifying unit 130 of the firmware verifying apparatus 100 may verify the firmware certificate of the firmware by using the obtained root public key.

In an example embodiment, the verifying unit 130 may obtain the hash value of the firmware certificate by decoding the signature of the firmware certificate by using the root public key. Also, the verifying unit 130 may calculate the hash value of the firmware certificate by applying the hash algorithm to the firmware certificate. Then, the verifying unit 130 may verify the firmware certificate by comparing the obtained hash value of the firmware certificate and the calculated hash value. That is, when the obtained hash value of the firmware certificate and the calculated hash value match, the verifying unit 130 may determine that the firmware certificate is valid.

Alternatively, or in addition, the verifying unit 130 may obtain the hash value of the firmware public key by decoding the signature of the firmware certificate using the root public key. Also, the verifying unit 130 may calculate the hash value by applying the hash algorithm to the firmware public key in the firmware certificate. Then, the verifying unit 130 may verify the firmware certificate by comparing the hash value obtained from the signature of the firmware certificate with the hash value of the firmware public key of the firmware certificate. That is, when the hash value obtained from the signature of the firmware certificate and the calculated hash value of the firmware public key included in the firmware certificate match, the verifying unit 130 may determine that the firmware certificate is valid.

Referring to FIG. 4, the verifying unit 130 may verify the firmware public key by comparing the hash value (e.g., a fingerprint) of the firmware public key with the fingerprint region in the memory of the electronic device (S230).

The fingerprint region within the memory of the electronic device may include a blacklist fingerprint, a whitelist fingerprint, and a preliminary fingerprint. The blacklist fingerprint represents an unavailable fingerprint, the whitelist fingerprint represents an available fingerprint, and the preliminary fingerprint is for a new fingerprint.

Figure 5:
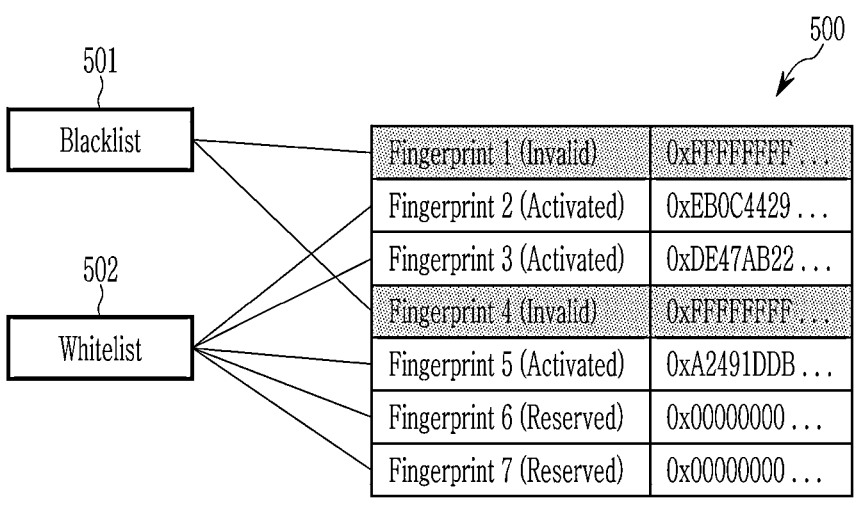
FIG. 5 is a view representing a fingerprint region according to an example embodiment.

FIG. 5 is a view representing a fingerprint region 500 according to an example embodiment.

In an example embodiment, the blacklist fingerprint 501 may correspond to the firmware signing key pair that is no longer in use and has been revoked. For example, when the private firmware key or the firmware signing key pair is maliciously stolen by a third party, the leaked firmware signing key pair is discarded, and the whitelist fingerprint in the OTP memory of the electronic device may be changed to the blacklist fingerprint through the firmware update, etc. That is, even if the firmware public key in the firmware certificate determined to be valid by the root public key is the same as the blacklist fingerprint, the firmware public key may not be used. In FIG. 5, the fingerprints 1 and 4 correspond to the revoked firmware signing key pairs and may correspond to the blacklist fingerprints.

In an example embodiment, the whitelist fingerprint 502 may correspond to the firmware public key in the firmware certificate determined to be valid by the root public key. The verifying unit 130 may determine that the firmware public key is valid when the fingerprint of the firmware public key in the firmware certificate determined to be valid by the root public key is the same as the whitelist fingerprint. In FIG. 5, the fingerprints 2, 3, and 5 correspond to the valid firmware signing key pair and may correspond to the whitelist fingerprints. For example, when the hash value of the firmware public key in the firmware certificate is 0xA2491DDB, . . . , the verifying unit 130 may confirm that the hash value of the firmware public key is the same as the fingerprint 5 previously stored in the fingerprint region and determine that the firmware public key is valid.

In an example embodiment, the preliminary fingerprint is for the fingerprint of the firmware public key that is not identical to the blacklist fingerprint and the whitelist fingerprint. The verifying unit 130 may record the corresponding fingerprint to the preliminary fingerprint when the fingerprint of the firmware public key in the firmware certificate determined to be valid by the root public key is not the same as either the blacklist fingerprint or the whitelist fingerprint, and mark the state of the recorded fingerprint as available. In FIG. 5, the new fingerprint may be recorded at the fingerprint 6 or 7 and may be marked as an available fingerprint.

In an example embodiment, since the firmware signing key pair may be changed periodically, even if the whitelist fingerprint exists in the fingerprint region, the preliminary fingerprint may be desired or required in the fingerprint region for the fingerprint of the firmware public key of the changed firmware signing key pair. For example, when the firmware signing key pair is changed according to the desired (or alternatively, predetermined) cycle (e.g., several months or several years), the firmware public key having the fingerprint different from the whitelist fingerprint in the fingerprint region may be used. In some example embodiments, the fingerprint of the firmware public key changed according to a desired (or alternatively, predetermined) cycle may be registered in the fingerprint region as the preliminary fingerprint, and then become a new whitelist fingerprint. Accordingly, the fingerprint of the firmware public key in the firmware certificate determined to be valid may be the whitelist fingerprint or the preliminary fingerprint.

As described above, since the validity of the firmware public key may be determined through the comparison with the fingerprint in the fingerprint region, a periodic/non-periodic rotation of the firmware signing key pair may be possible.

Referring to FIG. 4, when the firmware public key is verified through the comparison with the fingerprint region, the verifying unit 130 may verify the firmware by using the firmware public key (S240).

In an example embodiment, the verifying unit 130 may calculate a hash value by applying the hash algorithm to the firmware included in the firmware image. In addition, the verifying unit 130 may obtain the hash value of the firmware by decoding the firmware signature by using the firmware public key. Then, the verifying unit 130 may verify the validity of the firmware by comparing the hash value calculated through the hash algorithm with the hash value obtained from the firmware signature.

In an example embodiment, the verifying unit 130 may determine that the firmware is invalid when the hash value calculated through the hash algorithm and the hash value obtained from the decoded firmware signature are different from each other. When the controller 110 determines that the firmware is invalid by the verifying unit 130, the controller 110 may discard the received firmware image.

In an example embodiment, the verifying unit 130 may determine that the firmware is valid when the hash value calculated through the hash algorithm and the hash value obtained from the decoded firmware signature are the same as each other. When the firmware is determined to be valid by the verifying unit 130, the controller 110 may transfer the firmware to the flash memory controlled by the controller for the installation of the firmware.

In some example embodiments, the validity of the firmware may be sequentially verified by the certificate chain of the root certificate and the firmware certificate, and accordingly, the security of the firmware for updating the electronic device may be strengthened. In addition, since the validity of the firmware public key may be determined through the comparison with the fingerprint in the fingerprint region, the firmware signing key pair may be periodically/non-periodically changed and used. Transferring the verified valid firmware to memory, and installing the firmware, changes technical operation of hardware of the electronic device according to the installed firmware. Some example embodiments improve security of firmware installation and address a limitation of storage space of electronic devices for security keys, by implementing verification of the certificate chain of the root certificate and the firmware certificate.

Figure 6:
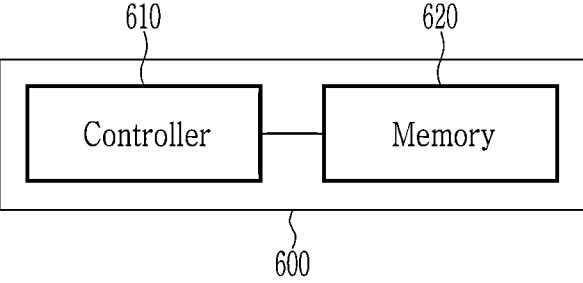
FIG. 6 is a block diagram showing an electronic device according to an example embodiment.

FIG. 6 is a block diagram showing an electronic device according to an example embodiment.

Referring to FIG. 6, the electronic device 600 may include a controller 610 and a memory apparatus 620.

The controller 610 may control a memory operation of the memory apparatus 620 by providing a signal to the memory apparatus 620 in response to a request from a host system (not shown). The signal may include an instruction and an address. The controller 610 may read data from the memory apparatus 620 by providing a read signal to the memory apparatus 620. In addition, the controller 610 may write data in the memory apparatus 620 by providing a write signal and data to the memory apparatus 620.

In some example embodiments, the memory apparatus 620 may include a volatile memory, such as a dynamic random-access memory (DRAM). In some example embodiments, the memory apparatus 620 may include a non-volatile memory such as a flash memory, a phase-change memory, a resistive memory, a magneto resistive memory, a ferroelectric memory, or a polymer memory, but example embodiments are not limited thereto. In some example embodiments, the memory apparatus 620 may be used as a system memory of a host system. In some example embodiments, the controller 610 may be provided as a separate chip from the processor of the host system or as an internal component of the processor. In some example embodiments, the electronic device 600 may be used as a storage apparatus of the host system.

The firmware verifying apparatus described with reference to FIG. 1 to FIG. 5 is included in the host system, the controller 610, and/or the memory apparatus 620 to verify the validity of the firmware.

Figure 7:
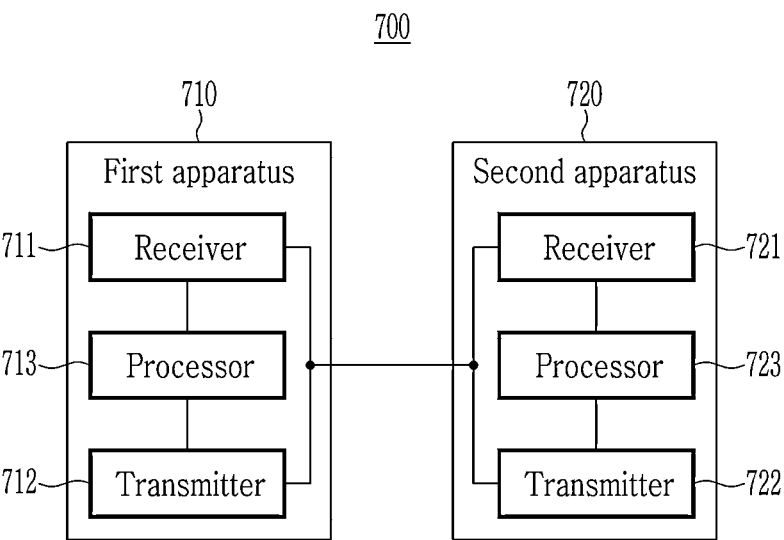
FIG. 7 is a block diagram showing an example of a system according to an example embodiment.

FIG. 7 is a block diagram showing an example of a system according to an example embodiment.

Referring to FIG. 7, a system 700 may include a first apparatus 710 and a second apparatus 720.

The first apparatus 710 may include a transmitter 712, a receiver 711, and a processor 713, and the second apparatus 720 may include a transmitter 722, a receiver 721, and a processor 723. The transmitter 712 of the first apparatus 710 may transmit data, and the receiver 721 of the second apparatus 720 may receive data. Similarly, the transmitter 722 of the second apparatus 720 may transmit data to the first apparatus 710, and the receiver 711 of the first apparatus 710 may receive data. The processor 713 may control the operations of the transmitter 712 and the receiver 711, and the processor 723 may control the operations of the transmitter 722 and the receiver 721.

The firmware manufacturing apparatus and/or the firmware verifying apparatus described with reference to FIG. 1 to FIG. 5 is included in the transmitter 712, the receiver 711, the transmitter 722, and/or the receiver 721, thereby converting an analog voltage into a digital signal.

FIG. 6 and FIG. 7 show the firmware manufacturing apparatus and/or the firmware verifying apparatus used in the electronic device and the system, but the system or the apparatus to which the firmware manufacturing apparatus and/or the firmware verifying apparatus are applied is not limited thereto. The firmware manufacturing apparatus and/or the firmware verifying apparatus may generate the firmware image by using the certificate chain in various apparatuses and verify the validity of the firmware.

In some example embodiments, each constituent element, module, or unit expressed as a block in FIG. 1 to FIG. 7 may be implemented with various numbers of hardware, software, and/or firmware structures that execute each function described above, according to an example embodiment. For example, at least one constituent element, module, or unit may include various hardware constituent elements including digital circuits, programmable or non-programmable logic apparatus or arrays, application specific integrated circuits (ASICs), or other circuits that use digital circuit structures such as memory, processors, logic circuits, lookup tables, etc., which may execute each function through a control of at least one microprocessor or other control apparatus, but example embodiments are not limited thereto. In addition, at least one constituent element, module, or unit includes at least one executable instruction word for performing a specific logic function and may be executed by at least one microprocessor or other control apparatus. In addition, at least one constituent element, module, or unit may include a processor such as a CPU or microprocessor that performs each function or may be implemented by a processor. A functional feature of any example embodiment may be implemented as an algorithm running on at least one processor.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been described in connection with some example embodiments, it is to be understood that the inventive concepts are not limited to the disclosed example embodiments. On the contrary, various modifications and equivalent arrangements may be included within the scope of the inventive concepts.

What is claimed is:

1. A method for verifying firmware, the method comprising:
    verifying a firmware certificate of the firmware using a first public key;
    verifying validity of a second public key included in the firmware certificate in response to successful verification of the firmware certificate;
    verifying the firmware using the second public key in response to successful verification of the validity of the second public key; and
    in response to successful verification of validity of the firmware, installing the firmware in memory of an electronic device to operate hardware of the electronic device according to the firmware, wherein the verifying the firmware certificate of the firmware, the verifying the validity of the second public key, and the verifying the firmware using the second public key are performed sequentially.

2. The method of claim 1, further comprising:
    obtaining the first public key from the memory of the electronic device.

3. The method of claim 2, wherein the obtaining of the first public key from the memory of the electronic device comprises:
    checking an index of a first signing key pair currently used in a key index region of the electronic device; and
    obtaining the first public key with the index from a read only memory (ROM) of the electronic device.

4. The method of claim 1, wherein the verifying of the firmware certificate of the firmware using the first public key comprises:
    obtaining a first hash value of the firmware certificate by decrypting a signature of the firmware certificate using the first public key;
    calculating a second hash value of the firmware certificate using a hash algorithm; and
    verifying the firmware certificate by comparing the first hash value and the second hash value.

5. The method of claim 4, wherein the verifying of the firmware certificate by comparing the first hash value and the second hash value comprises:
    discarding a firmware image of the firmware when the first hash value and the second hash value are different; or
    determining that the firmware certificate is valid when the first hash value and the second hash value are same.

6. The method of claim 1, wherein the verifying of the second public key included in the firmware certificate in response to successful verification of the firmware comprises:
    determining that the second public key is valid when a hash value of the second public key is not same as a blacklist fingerprint in a fingerprint region in the electronic device.

7. The method of claim 6, wherein the determining that the second public key is valid when the hash value of the second public key is not the same as the blacklist fingerprint in the fingerprint region in the electronic device comprises:
    determining that the second public key is valid when the hash value of the second public key is same as a whitelist fingerprint in the fingerprint region.

8. The method of claim 6, wherein the determining that the second public key is valid when the hash value of the second public key is not the same as the blacklist fingerprint in the fingerprint region in the electronic device comprises:
    recording the hash value of the second public key in the fingerprint region; and
    determining that the second public key is valid when a same hash value as the hash value of the second public key does not exist in the fingerprint region.

9. The method of claim 1, wherein the verifying of the firmware using the second public key obtained from the firmware certificate comprises:
    calculating a first hash value of the firmware using a hash algorithm;
    obtaining a second hash value by decoding a firmware signature using the second public key; and
    verifying the validity of the firmware by comparing the first hash value and the second hash value.

10. The method of claim 9, wherein the verifying of the validity of the firmware by comparing the first hash value and the second hash value comprises:

discarding a firmware image of the firmware when the first hash value and the second hash value are different; or determining that the firmware is valid when the first hash value and the second hash value are same.

11. An apparatus for verifying firmware for updating an electronic device, the apparatus comprising:

a processor; and a memory, wherein the processor is configured to execute a program included in the memory to perform, verifying a firmware certificate of the firmware using a root public key;

verifying a firmware public key obtained from the firmware certificate;

verifying the firmware using the firmware public key in response to a successful verification of validity of the firmware public key; and installing the firmware in the memory to operate hardware of the electronic device according to the firmware, wherein the verifying the firmware certificate, the verifying the firmware public key, and the verifying the firmware using the firmware public key are performed sequentially.

12. The apparatus of claim 11, wherein when verifying of the firmware certificate of the firmware by using the root public key, the processor is configured to perform:

obtaining a first hash value of the firmware certificate from a signature of the firmware certificate decrypted using the root public key;

calculating a second hash value of the firmware certificate by using a hash algorithm; and

14 determining that the firmware certificate is valid when the second hash value and the first hash value are same.

13. The apparatus of claim 11, wherein when verifying of the firmware public key obtained from the firmware certificate, the processor is configured to perform:

determining that the firmware certificate is valid when a hash value of the firmware public key is same as a whitelist fingerprint in a fingerprint region in the electronic device.

14. The apparatus of claim 11, wherein when verifying of the firmware public key obtained from the firmware certificate, the processor is configured to perform:

registering a hash value of the firmware public key to a fingerprint region; and determining that the firmware public key is valid when the hash value is not same as a blacklist fingerprint or a whitelist fingerprint in the fingerprint region in the electronic device.

15. The apparatus of claim 11, wherein the processor is configured to execute the program to further perform:

checking an index of a first signing key pair currently used in a key index region of the electronic device; and obtaining a first public key with the index from a read only memory (ROM) of the electronic device.

16. The apparatus of claim 11, wherein when verifying the firmware using the firmware public key in response to the successful verification of validity of the firmware public key, the processor is configured to perform:

calculating a first hash value of the firmware using a hash algorithm;

obtaining a second hash value of the firmware by decrypting a firmware signature using the firmware public key; and determining that the firmware is valid when the first hash value and the second hash value are same.

* * * * *